US009336415B2

(12) United States Patent  
Fleury et al.

(10) Patent No.: US 9,336,415 B2  
(45) Date of Patent: May 10, 2016

(54) DEVICE FOR SECURING A CAPACITIVE KEYPAD AND CORRESPONDING TERMINAL

(71) Applicant: Compagnie Industrielle et Financiere d'Ingenierie "Ingenico", Paris (FR)

(72) Inventors: Fabrice Fleury, Toulaud (FR); Jean-Eric Lemaire, Valence (FR)

(73) Assignee: INGENICO GROUP, Paris (FR)

( * ) Notice: Subject to any disclaimer, the term of this patent is extended or adjusted under 35 U.S.C. 154(b) by 19 days.

(21) Appl. No.: 14/340,090

(22) Filed: Jul. 24, 2014

(65) Prior Publication Data  
US 2015/0033368 A1 Jan. 29, 2015

(30) Foreign Application Priority Data  
Jul. 26, 2013 (FR) .................. 13 57422

(51) Int. Cl.  
G06F 21/00 (2013.01)  
G06F 21/83 (2013.01)

(52) U.S. Cl.  
CPC .................. G06F 21/83 (2013.01)

(58) Field of Classification Search  
CPC ........................ G06F 21/83  
See application file for complete search history.

(56) References Cited

U.S. PATENT DOCUMENTS 6,049,790 A * 4/2000 Rhelimi ............... G06F 3/021 341/22  
7,840,006 B2 * 11/2010 Ogawa ................. G06F 21/10 380/201  
2008/0294563 A1 * 11/2008 Boutahar ............. G06Q 20/00 705/76  
2010/0217709 A1 * 8/2010 Aabye ................. G06Q 20/10 705/44  
2010/0223463 A1 * 9/2010 Sakaguchi ............ H04L 9/083 713/168  
2011/0102097 A1 * 5/2011 Payan ................. G01R 27/2664 333/33  
2012/0149357 A1 * 6/2012 Wu ..................... H04L 63/0853 455/419  
2012/0281839 A1 * 11/2012 Arnold ................. G06F 21/602 380/277  
2012/0326998 A1 * 12/2012 Baentsch ............. G06F 21/83 345/173  
2013/0027613 A1 * 1/2013 Kim .................... H04N 21/4126 348/563

FOREIGN PATENT DOCUMENTS

WO 2012139133 A1 10/2012

OTHER PUBLICATIONS

French Search Report dated Feb. 13, 2014 for corresponding French Application No. FR1357422 filed Jul. 26, 2013.

* cited by examiner

Primary Examiner — Morshed Mehedi  
(74) Attorney, Agent, or Firm — David D. Brush; Westman, Champlin & Koehler, P.A.

(57) ABSTRACT

A securing device is provided for securing a capacitive keypad of an electronic payment terminal having at least one processor for managing keys of the capacitive keypad. The securing device is configured for communicating with the processor and includes a driving module for driving at least one simulation element for simulating at least one keystroke on the capacitive keypad. The driving module includes a receiver for receiving at least one simulation command randomly transmitted by the processor.

7 Claims, 2 Drawing Sheets

DEVICE FOR SECURING A CAPACITIVE KEYPAD AND CORRESPONDING TERMINAL

1 FIELD OF THE DISCLOSURE

Figure 1:
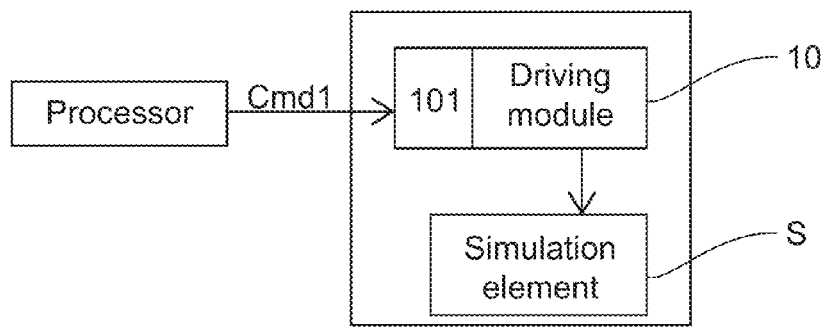

The present disclosure relates to the field of the securing of payment terminals, and more particularly to the protection of data entered by a user through the keypad of such terminals.

Indeed, such data, such as for example the secret code entered by the user, can be considered to be sensitive data that must be protected from possible hackers to meet the standards of safety and comfort for putting such terminals on the market.

In particular, the disclosure can be applied to electronic payment terminals having a capacitive keypad.

2 PRIOR-ART SOLUTIONS

Certain present-day electronic payment terminals integrate a touch pad. This raises new problems of security related to snooping on the use of such keypads.

Indeed, there exist "snooping" systems that seek to try and retrieve the data entered by a user through the touch keypad of an electronic payment terminal, for example by observation of the "traces" left by the user's fingers or again by measurement of the signal levels at the keys of a capacitive keypad. Now, there is no reliable solution to date that can overcome this problem of the hacking of a capacitive keypad.

Certain prior-art solutions are aimed at detecting the deterioration of such a keypad, for example a tearing away or a breakage of the keypad glass. This is done by adding a "guard ring" around the keypad, for example in the form of a conductive line made of copper or according to a technology known as the ITO (Indium Tin Oxide) technology.

By contrast, this type of approach for protecting touch keypads against intrusion does not resolve the problems of the hacking of data entered via capacitive keypads.

3 SUMMARY

An exemplary embodiment of the disclosure relates to a securing device for securing a capacitive keypad of an electronic payment terminal comprising at least one processor for managing the keys of said capacitive keypad.

According to a particular embodiment, the securing device is capable of communicating with said processor and said securing device comprises a driving module (10) for driving at least one simulation element (S) for simulating at least one keystroke on said capacitive keypad, said driving module comprising a receiver (101) for receiving at least one simulation command (Cmd1) randomly transmitted by said processor.

Thus, a particular embodiment proposes a novel and inventive solution to the securing of a capacitive keypad of an electronic payment terminal, especially with respect to "hackers" applying systems for snooping on the entry of a confidential code based on a measurement of the signal level of the keys for example.

The solution of a particular embodiment is based on the simulation of random keystrokes, for example during an entry of confidential data by a user, so as to disrupt any snooping operation. Besides, since this simulation is driven by the processor for managing the keys of the capacitive keypad of the electronic payment terminal itself, the working of this processor is not disrupted by these simulated keystrokes because it does not interpret the simulated keystrokes, originating from itself, as real keystrokes.

However, a snooping device applied to the capacitive keypad of the electronic payment terminal would be disrupted by these random keystrokes, which it would interpret as real keystrokes which would therefore prevent it from detecting sensitive data being entered by the user at the same time.

According to one particular characteristic, the simulation element (S) implements at least one capacitor (CP1) of a predetermined value called a parasitic capacitor and the driving module activates this parasitic capacitor (CP1) by closing at least one switch, said parasitic capacitor (CP1) being connected, when said switch is closed, to at least one receiver electrode (Y1) connected to at least one key of said capacitive keypad.

Thus, according to this embodiment, the securing device implements a simulation of a keystroke via a capacitor called a parasitic capacitor activated for example by the closing of a switch upon reception of a simulation command coming from the processor of the electronic payment terminal. In this way, when the switch is closed, the parasitic capacitor is directly connected to a receiver electrode itself connected to one or more keys of the touch keypad.

Depending on the characteristics of the simulation command (duration, frequency, etc), one or more keys connected to the receiver electrode are involved and one or more keystrokes are therefore simulated.

According to one particular characteristic, the simulation element (S) implements at least one capacitor (CP1) of a predetermined value, called a parasitic capacitor, and the driving module activates this parasitic capacitor (CP1) by means of at least one transistor, said parasitic capacitor (CP1) being connected, when said transistor is activated, to at least one receiver electrode (Y1) connected to at least one key of said capacitive keypad.

Thus, according to this embodiment, the securing device implements a simulation of a keystroke via a capacitor called a parasitic capacitor activated for example by means of a transistor upon reception of a simulation command coming from the processor of the electronic payment terminal. In this way, when the transistor is activated, the parasitic capacitor is directly connected to a receiver electrode itself connected to one or more keys of the touch keypad.

Depending on the characteristics of the simulation command (duration, frequency, etc), one or more keys connected to the receiver electrode are concerned and one or more keystrokes are therefore simulated.

In particular, the driving module is capable of driving at least two parasitic capacitors (CP1, CP2) upon reception of at least two distinct simulation commands (Cmd1, Cmd2) coming from said processor, each of said parasitic capacitors being connected to a distinct receiver electrode (Y1, Y2) enabling the simulation of at least all the numerical keys of said capacitive keypad.

Thus, according to this embodiment, at least all the numerical keys corresponding most of the time to sensitive data such as a confidential code or a bank card number can be simulated to deceive a possible spy device implemented on the capacitive keypad of the electronic payment terminal.

For example, the predetermined value of said parasitic capacitor corresponds appreciably to a capacitive value representing a stroke on a key of said capacitive keypad.

According to one particular aspect, the device is implemented in a secure zone of said electronic payment terminal.

Thus, according to this embodiment, the securing device is itself located within the electronic payment terminal in a zone protected by elements implemented in the electronic payment terminal so that the securing device cannot be inhibited or damaged. The security of the entry of sensitive data on the capacitive keypad of the electronic payment terminal is therefore optimal.

An embodiment of the disclosure also concerns an electronic payment terminal comprising a securing device as described here above.

An embodiment of the disclosure also concerns a method for securing a capacitive keypad of an electronic payment terminal comprising at least one processor for managing keys of said capacitive keypad comprising the following steps:

a reception step (30) for receiving at least one simulation command (Cmd1) transmitted randomly by said processor;

a driving step (31), activated by said reception step, for driving at least one simulation element (S) for simulating at least one keystroke on said capacitive keypad;

a simulation step (32) for simulating at least one keystroke on said capacitive keypad.

An embodiment of the disclosure also pertains to a computer program downloadable from a communication network and/or stored on a computer-readable medium and/or executable by a processor comprising program code instructions to execute the method of securing as described here above when it is executed by a processor.

4 LIST OF FIGURES

Figure 2:
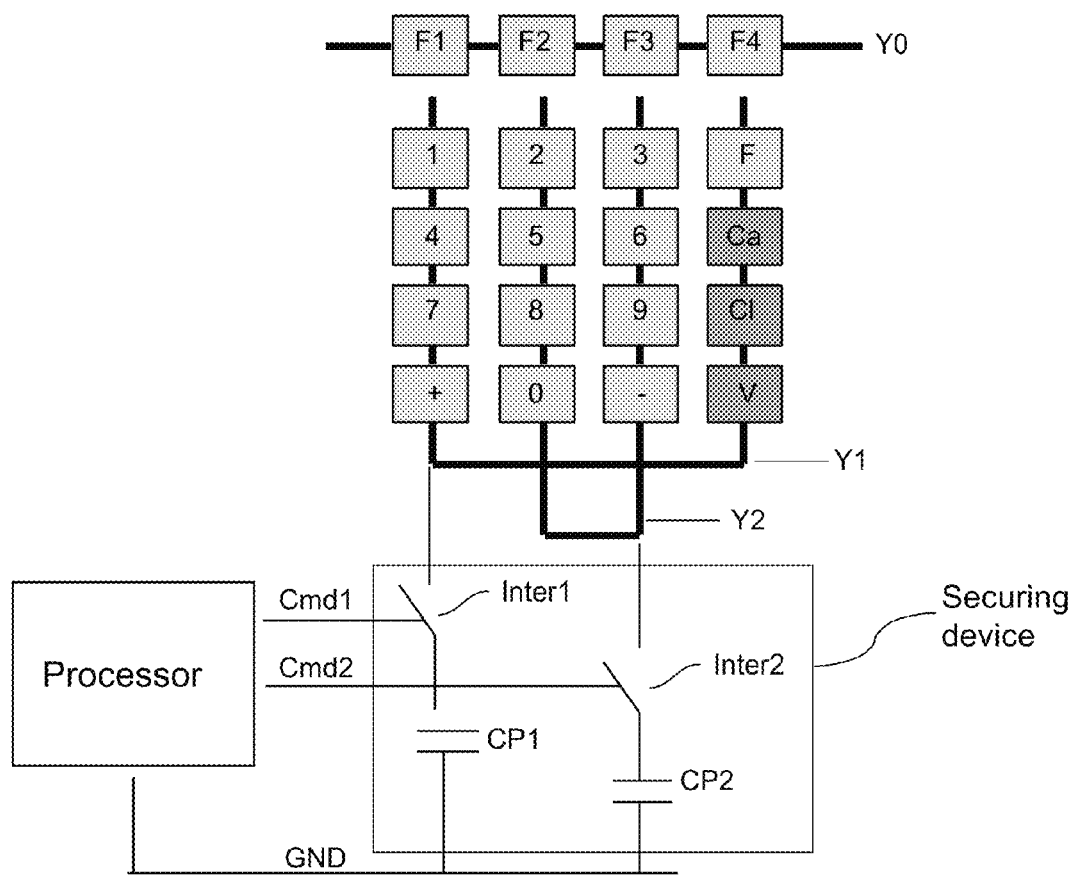
Figure 3:
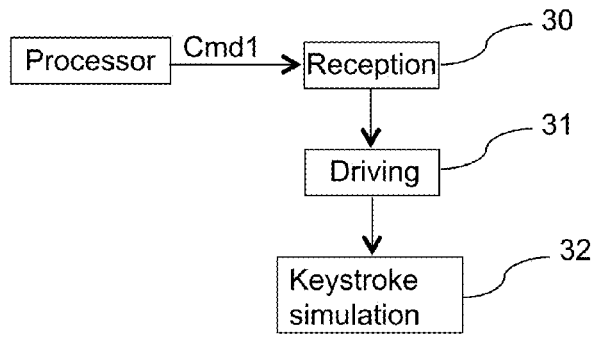
Figure 4:
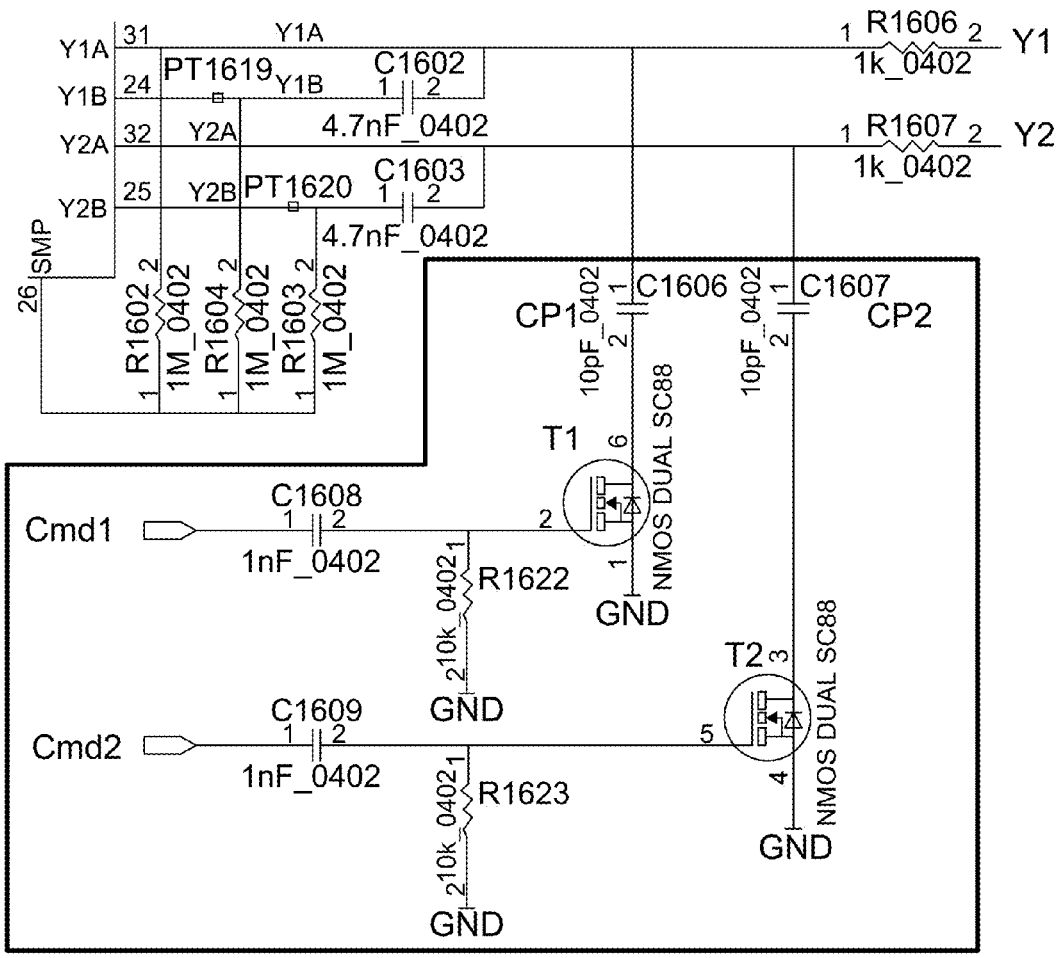

Other features and advantages of embodiments of the disclosure shall appear more clearly from the following description of a particular embodiment given by way of a simple illustratory and non-limiting example and from the appended drawings, of which:

FIG. 1 is a diagram of a device for securing a touch keypad of an electronic payment terminal according to one embodiment of the disclosure;

FIGS. 2 and 4 present two examples of implementing a device for securing a touch keypad of an electronic payment terminal according to one embodiment of the disclosure;

FIG. 3 presents the main steps of the method for securing a touch keypad of an electronic payment terminal according to one embodiment of the disclosure.

5 DETAILED DESCRIPTION OF THE INVENTION

5.1 General Principle

The principle of an illustrative embodiment includes the implementation of a device for securing the capacitive keypad of an electronic payment terminal. This device, applied in the electronic payment terminal, is aimed at deceiving a system that might be snooping on the keystrokes on the keypad, for example when a user is entering sensitive data.

Indeed, the principle relies on the simulation of keystrokes so as to disrupt any snooping system based on the measurement of the signal at the keys of the capacitive keypad. Thus, this simulation can be implemented for example at the same time as the real entry of data by a user via the capacitive keypad, namely at a time when a possible snooping device is also being used.

However, with these keystroke simulations, the securing system should not disrupt the process for managing keys of the electronic payment terminal itself. This is why the an embodiment of the disclosure provides that the securing device will communicate with the process for managing keys of the capacitive keypad of the electronic payment terminal. This communication can be done directly, from the processor for managing keys of the securing device or via one or more intermediate modules/elements according to the different particular embodiments.

Thus, in different embodiments, this processor will randomly transmit one or more keystroke simulation commands to the securing device in order to deceive any snooping system. As a result, since it is the processor that is the source (directly or indirectly) of the keystroke simulating commands, it is not disrupted in its interpretation of "real" keystrokes performed by a user on the keypad. Indeed, the processor knows the time at which it transmits a keystroke simulation command and therefore does not interpret the simulated keystroke as being a real keystroke.

Finally, the random nature of this simulation of keystrokes prevents a detection of the securing device in such a way that a snooping device, if any, cannot be modified to take account of it. Thus, even if a snooping system, if any, were to suspect the existence of the implementing of this securing device, it would not be able to avoid it since the simulated keystrokes cannot be identified or predicted because of their random nature.

It must be noted that embodiments of the present disclosure also applies to any payment terminal having a touch pad or "touchscreen" using capacitive technology, i.e. implementing sender/receiver electrodes.

5.2 Description Of One Embodiment Of The Disclosure

A more detailed description shall now be provided of an embodiment of a securing device for securing a capacitive keypad of an electronic payment terminal with reference to FIGS. 1 to 4.

FIG. 1 illustrates an example of such a device comprising a driving module 10 for driving an element S for simulating keystrokes.

According to this embodiment, the driving module also comprises a receiver 101 configured for receiving simulation commands transmitted randomly by a processor (the processor for managing the keys of the capacitive keyboard or else a processor related to the latter) of the electronic payment terminal.

Thus, at reception of a simulation command Cmd1, transmitted randomly by the processor of the electronic payment terminal and received by the receiver 101 of the driving module 10, this module activates the element S for simulating a keystroke.

A snooping system, if any, for snooping on the keystrokes on the capacitive keypad of the electronic payment terminal then detects a keystroke without however being able to identify it as a simulated keystroke. The snooping is then disrupted and it is therefore no longer possible then to identify the data really entered by the user on this capacitive keypad of the electronic payment terminal.

Ideally, the device for securing the keypad is activated only during the real entry of data by a user on this keypad. Indeed, it is not necessary (or economical in terms of optimization of the use of components of the electronic payment terminal) to simulate keystrokes throughout the time of use of the electronic payment terminal but only during phases when the keypad is being used or even only when pieces of data identified as sensitive data are likely to be entered by a user. Furthermore, if the activation of the securing device is limited to precise instants, the detection of this device is made more difficult and its action is made more efficient.

FIG. 3 illustrates the main steps implemented in a securing device as presented in FIG. 1, namely a first step 30 for receiving a simulation command transmitted randomly by the processor of the electronic payment terminal, activating a step 31 for driving a keystroke simulation element, leading to a step 32 for simulating a keystroke.

FIG. 2 for its part illustrates a first example of implementation of a securing device of a touch keypad as described here above in an electronic payment terminal.

Thus, in this particular embodiment, the capacitive keyboard is considered to be constituted by a matrix of four columns and four rows classically having numerical keys (from 0 to 9) as well as function keys such as "Confirm", "Cancel", "Correct", etc.

Each of these keys is connected to a receiver electrode enabling the detection of a keystroke, these receiver electrodes being three in number in this example and being denoted Y0, Y1 and Y2.

According to this embodiment, the securing device comprises a driving module enabling the simulation of at least one keystroke for all the numerical keys likely to be used, for example for entering a confidential code. Thus, the driving module enables the simulation of a keystroke on keys connected to the receiver electrodes Y1 and Y2 of the capacitive keyboard, the receiver electrode Y0 being no longer concerned according to this particular embodiment. To this end, two simulation elements are needed, denoted as CP1 and CP2.

It must be noted that according to different embodiments, all three receiver electrodes may be involved so as to be able to simulate a keystroke on all the keys of the keypad. This would potentially require the use of three simulation elements.

In this embodiment, each simulation element implements a capacitor called a parasitic capacitor making it possible, when actuated, to simulate one or more keystrokes.

Thus, the parasitic capacitor CP1 is connected, when activated, to the receiver electrode Y1 and the parasitic capacitor CP2 is connected, when activated, to the receiver electrode Y2.

Besides, the driving module comprises two switches, Inter1 and Inter2, which are closed upon reception of a specific simulation command received from the processor, respectively denoted as Cmd1 and Cmd2. These two switches Inter1 and Inter2 enable the connection respectively of the parasitic capacitor CP1 to the receiver electrode Y1 and of the parasitic capacitor CP2 to the receiver electrode Y2.

Thus, when a simulation command Cmd1 is received by the securing device via the receiver of its driving module, the switch Inter1 connects the parasitic capacitor CP1 to the electrode Y1 thus simulating, according to the parameters of simulation command Cmd1, strokes on one or more of the keys 1, 4, 7, +, F, Ca, CI and V.

Similarly, when a simulation command Cmd2 is received by the securing device via the receiver of its driving module, the switch Inter1 connects the parasitic capacitor CP2 to the electrode Y2 thus simulating, according to the parameters of simulation command Cmd2, strokes on one or more of the keys 2, 5, 8, 0, 3, 6, 9 and –.

In practice, it is not necessary for all the keys to be simulated. The random simulation of four numerical keys makes it possible, for example, to deceive a possible snooping device while at the same time remaining non-detectable.

According to one embodiment illustrated in FIG. 4, the driving module of the securing device implements one or more transistors (T1, T2) making it possible, upon reception of one or more simultaneous commands (Cmd1, Cmd2) from the processor of the electronic payment terminal, to activate one or more parasitic capacitors (CP1, CP2) enabling them, on their own, to disrupt the operation of one or more reception electrodes (Y1, Y2) of the capacitive keypad.

Any other means that make it possible to provide a low capacitance for the simulation of a keystroke on a capacitive keypad can of course be implemented according to other particular embodiments of the disclosure not described here.

Although the present disclosure has been described with reference to one or more examples, workers skilled in the art will recognize that changes may be made in form and detail without departing from the scope of the disclosure and/or the appended claims.

The invention claimed is:

1. A securing device for securing a capacitive keypad of an electronic payment terminal comprising at least one processor for managing keys of said capacitive keypad, wherein:
    said securing device is configured to communicate with said processor,
    said securing device comprises a driving module configured to drive at least one simulation element configured to simulate at least one keystroke on said capacitive keypad,
    said driving module comprises a receiver configured to receive at least one simulation command randomly transmitted by said processor,
    said simulation element implements at least one capacitor of a predetermined value called a parasitic capacitor,
    said driving module activates this parasitic capacitor by closing at least one switch, said parasitic capacitor being connected, when said switch is closed, to at least one receiver electrode connected to at least one key of said capacitive keypad, and
    said driving module is configured to drive at least two parasitic capacitors upon reception of at least two distinct simulation commands coming from said processor, each of said parasitic capacitors being connected to a distinct receiver electrode enabling simulation of at least all the numerical keys of said capacitive keypad.

2. The securing device according to claim 1, wherein said switch is a transistor.

3. The securing device according to claim 1, wherein said predetermined value of said parasitic capacitor corresponds appreciably to a capacitive value representing a stroke on a key of said capacitive keypad.

4. The securing device according to claim 3, wherein the securing device is implemented in a secure zone of said electronic payment terminal.

5. An electronic payment terminal comprising the securing device according to claim 1.

6. A method comprising:
    securing a capacitive keypad of an electronic payment terminal comprising at least one processor for managing keys of said capacitive keypad, wherein securing comprises:
    receiving by a securing device, configured to communicate with said processor and comprising a driving module configured to drive at least one simulation element configured to simulate at least one keystroke on said capacitive keypad, at least one simulation command transmitted randomly by said processor;
    in response to receiving the at least one simulation command, driving at least one simulation element by said securing device enabling simulation of at least all keystrokes on said capacitive keypad, said simulation element implementing at least one capacitor of a predetermined value called a parasitic capacitor, wherein driving at least one simulation element comprises:
    activating, by said driving module of said securing device, the parasitic capacitor by closing at least one switch, said parasitic capacitor being connected, when said switch is closed, to at least one receiver electrode connected to at least one key of said capacitive keypad, wherein said driving module of said securing device drives at least two parasitic capacitors upon reception of at least two distinct simulation commands coming from said processor, each of said parasitic capacitors being connected to a distinct receiver electrode enabling simulation of at least all the numerical keys of said capacitive keypad.

7. A non-transitory computer-readable medium comprising a computer program stored thereon, which is executable by a processor of a securing device and comprises program code instructions to execute a method of securing when the program is executed by the processor, wherein the method comprises:
  securing a capacitive keypad of an electronic payment terminal comprising at least one processor for managing keys of said capacitive keypad, wherein securing comprises:
  receiving by a securing device, configured to communicate with said processor and comprising a driving module configured to drive at least one simulation element configured to simulate at least one keystroke on said capacitive keypad, at least one simulation command transmitted randomly by said processor;
  in response to receiving the at least one simulation command, driving at least one simulation element by said securing device enabling simulation of at least all keystrokes on said capacitive keypad, said simulation element implementing at least one capacitor of a predetermined value called a parasitic capacitor, wherein driving at least one simulation element comprises:
    activating, by said driving module of said securing device, the parasitic capacitor by closing at least one switch, said parasitic capacitor being connected, when said switch is closed, to at least one receiver electrode connected to at least one key of said capacitive keypad, wherein said driving module of said securing device drives at least two parasitic capacitors upon reception of at least two distinct simulation commands coming from said processor, each of said parasitic capacitors being connected to a distinct receiver electrode enabling simulation of at least all the numerical keys of said capacitive keypad.

* * * * *